(12) United States Patent
Choi

(10) Patent No.: US 12,110,630 B2
(45) Date of Patent: Oct. 8, 2024

(54) CLOTHING TREATMENT DEVICE, ELECTRONIC APPARATUS, AND METHOD FOR CONTROLLING SAME

(71) Applicant: Samsung Electronics Co., Ltd., Suwon-si (KR)

(72) Inventor: Jihyouk Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 890 days.

(21) Appl. No.: 17/255,782

(22) PCT Filed: Jul. 10, 2019

(86) PCT No.: PCT/KR2019/008475
§ 371 (c)(1),
(2) Date: Dec. 23, 2020

(87) PCT Pub. No.: WO2020/036317
PCT Pub. Date: Feb. 20, 2020

(65) Prior Publication Data
US 2021/0140091 A1 May 13, 2021

(30) Foreign Application Priority Data
Aug. 14, 2018 (KR) .......................... 10-2018-0095152

(51) Int. Cl.
*D06F 58/36* (2020.01)
*D06F 33/32* (2020.01)
(Continued)

(52) U.S. Cl.
CPC .............. *D06F 58/36* (2020.02); *D06F 33/32* (2020.02); *D06F 58/10* (2013.01); *D06F 58/30* (2020.02);
(Continued)

(58) Field of Classification Search
CPC .......... D06F 58/36; D06F 58/30; D06F 33/32; D06F 58/10; D06F 2103/06; G06V 20/20;
(Continued)

(56) References Cited

U.S. PATENT DOCUMENTS 7,971,777 B2  7/2011  Ha
9,280,148 B1  3/2016  Colett et al.
(Continued)

FOREIGN PATENT DOCUMENTS

EP  3 252 226 A1  12/2017
EP  3 269 864 A1  1/2018
(Continued)

OTHER PUBLICATIONS

KR20090100803A—machine translation (Year: 2009).*
(Continued)

*Primary Examiner* — Tinsae B Ayalew
(74) *Attorney, Agent, or Firm* — Jefferson IP Law, LLP

(57) ABSTRACT

A clothing treatment device is disclosed. The disclosed clothing treatment device includes a clothing support device for supporting or fixing in place clothing inside an accommodation space of the clothing treatment device, a spray device for spraying steam or air on the clothing inside the accommodation space, a circulation device for circulating the air inside the accommodation space, a memory for storing a plurality of clothing management methods, and operation information of the spray device and the circulation device for each clothing management method, a processor which identifies the cloth information of the clothing inside the accommodation space, determines a clothing management method corresponding to the identified cloth information, from among the plurality of clothing management methods, and controls the spray device and the circulation device on the basis of the stored operation information
(Continued)

corresponding to the determined clothing management method.

7 Claims, 17 Drawing Sheets

(51) Int. Cl.
| | |
|---|---|
| *D06F 58/10* | (2006.01) |
| *D06F 58/30* | (2020.01) |
| *G06V 20/20* | (2022.01) |
| *G06V 30/19* | (2022.01) |
| *G06V 30/224* | (2022.01) |
| *D06F 103/06* | (2020.01) |
| *G06V 30/10* | (2022.01) |

(52) U.S. Cl.
CPC ........ *G06V 20/20* (2022.01); *G06V 30/19013* (2022.01); *G06V 30/2247* (2022.01); *D06F 2103/06* (2020.02); *G06V 30/10* (2022.01)

(58) Field of Classification Search
CPC ......... G06V 30/2247; G06V 30/19013; G06V 30/10
USPC .......................................... 68/12.01
See application file for complete search history.

(56) References Cited

U.S. PATENT DOCUMENTS

| | | | |
|---|---|---|---|
| 10,174,452 B2 | 1/2019 | Choi | |
| 10,563,338 B2 | 2/2020 | Chen et al. | |
| 10,712,922 B2 | 7/2020 | Schultz et al. | |
| 10,753,029 B2 | 8/2020 | Shu et al. | |
| 11,313,072 B2 | 4/2022 | Sights et al. | |
| 2009/0119848 A1 | 5/2009 | Kim et al. | |
| 2010/0205825 A1* | 8/2010 | Carow et al. ........... | D06F 58/36 34/88 |
| 2010/0236296 A1 | 9/2010 | Choi et al. | |
| 2012/0090099 A1 | 4/2012 | Kim et al. | |
| 2013/0290902 A1 | 10/2013 | Martin et al. | |
| 2014/0018962 A1 | 1/2014 | Jung et al. | |
| 2016/0150505 A1 | 5/2016 | Hedayat | |
| 2017/0350067 A1 | 12/2017 | Choi | |
| 2018/0044834 A1 | 2/2018 | Shu et al. | |
| 2018/0060937 A1 | 3/2018 | Shu et al. | |
| 2018/0127910 A1 | 5/2018 | Xu et al. | |
| 2018/0165736 A1 | 6/2018 | Love et al. | |
| 2018/0218433 A1 | 8/2018 | Penner et al. | |
| 2018/0363210 A1 | 12/2018 | Shu et al. | |
| 2019/0169780 A1 | 6/2019 | Chen et al. | |
| 2019/0382941 A1 | 12/2019 | Hwang et al. | |
| 2019/0385017 A1 | 12/2019 | Hwang et al. | |
| 2020/0018006 A1 | 1/2020 | So | |
| 2020/0096954 A1 | 3/2020 | Kim et al. | |
| 2020/0184127 A1 | 6/2020 | Bell et al. | |
| 2021/0297278 A1 | 9/2021 | Lee et al. | |

FOREIGN PATENT DOCUMENTS

| | | |
|---|---|---|
| EP | 3 290 560 A1 | 3/2018 |
| EP | 3 293 299 A1 | 3/2018 |
| EP | 3 396 057 A1 | 10/2018 |
| JP | 2002-282595 A | 10/2002 |
| JP | 2003-345872 A | 12/2003 |
| JP | 4021149 B2 | 12/2007 |
| JP | 2008-287348 A | 11/2008 |
| JP | 2013-240497 A | 12/2013 |
| JP | 2017-113419 A | 6/2017 |
| JP | 2018-194886 A | 12/2018 |
| KR | 10-2006-0117524 A | 11/2006 |
| KR | 10-2007-0036437 A | 4/2007 |
| KR | 10-2008-0109509 A | 12/2008 |
| KR | 10-2009-0017826 A | 2/2009 |
| KR | 10-2009-0100803 A | 9/2009 |
| KR | 10-2012-0038271 A | 4/2012 |
| KR | 10-1151428 B1 | 6/2012 |
| KR | 10-2013-0109721 A | 10/2013 |
| KR | 10-1362376 B1 | 2/2014 |
| KR | 10-2014-0073197 A | 6/2014 |
| KR | 10-2015-0066695 A | 6/2015 |
| KR | 10-1520655 B1 | 6/2015 |
| KR | 10-2017-0122774 A | 11/2017 |
| KR | 10-2017-0137505 A | 12/2017 |
| KR | 10-2017-0138559 A | 12/2017 |
| KR | 10-2201382 B1 | 1/2021 |
| WO | 2018/219330 A1 | 12/2018 |

OTHER PUBLICATIONS

KR20140073197A—machine translation (Year: 2014).*
U.S. Notice of Allowance dated May 13, 2022, issued in U.S. Appl. No. 16/719,227.
U.S. Notice of Allowance dated Feb. 8, 2023, issued in U.S. Appl. No. 17/896,421.
U.S. Non-Final Office Action dated Nov. 4, 2022, issued in U.S. Appl. No. 17/896,421.
European Search Report dated Sep. 21, 2021, issued in European Application No. 19907179.6.
Korean Office Action dated May 19, 2023, issued in Korean Patent Application No. 10-2018-0095152.
Korean Office Action dated Dec. 18, 2023, issued in Korean Application No. 10-2018-0174169.

* cited by examiner

FIG. 6

| 직물 이름 | Matter Name | FABRIC_NAME | FABRIC_PRIORITY | AVAIL_COURSE |
|---|---|---|---|---|
| SILK | | silk | 1 | 13 |
| 천연가죽 | Leather | fur_Leather | 2 | 19 |
| 코팅가죽 | Coated Leather | | | |
| 합성가죽 | Synthetic Leather | | | |
| 천연모피 | Natural fur | | | |
| 폴리염화비닐 | Polyvinyl chloride | delicate | 3 | 1, 2, 3, 4, 5, 6, 7, 8, 9, 10, 11, 12, 13, 14, 15, 16, 17, 18, 20, 21, 22, 23, 24 |
| DULL YAM | | | | |
| DULL YAM (LINEN) | | | | |
| WOOL | | | | |
| 모헤어 | mohair | | | |
| 캐시미어 | Cashmere | | | |
| 앙고라 | Angora | | | |
| 알파카 | Alpaca | | | |
| 깃털 | Feather | | | |
| 솜털 | Down | | | |
| 폴리우레탄 | Polyurethane | | | |
| 천연고무 | Natural rubber | | | |
| 합성고무 | Synthetic rubber | | | |
| 금속섬유 | Metal fiber | | | |
| 금속성섬유(지정외) | Metallic fiber | | | |
| 레이온(비스코스) | Rayon | | | |
| 큐프라 | Cupra | | | |
| 모달 | Modal | | | |
| 리오셀 | Rio Cell | | | |
| 셀룰로오스 섬유(지정외) | Cellulose fiber | | | |
| 나일론 | Nylon | normal | 4 | 1, 2, 3, 4, 5, 6, 7, 8, 9, 10, 12, 13, 14, 15, 16, 17, 18, 20, 21, 22, 23, 24, 25 |
| 폴리메틸메타크릴레이트 | Polymethyl methacrylate | | | |
| 폴리에스터 | Polyester | | | |
| 아크릴 | Acryl | | | |
| 아세테이트 | Acetate | | | |
| 트리아세테이트 | Triacetate | | | |
| 면 | Cotton | | | |

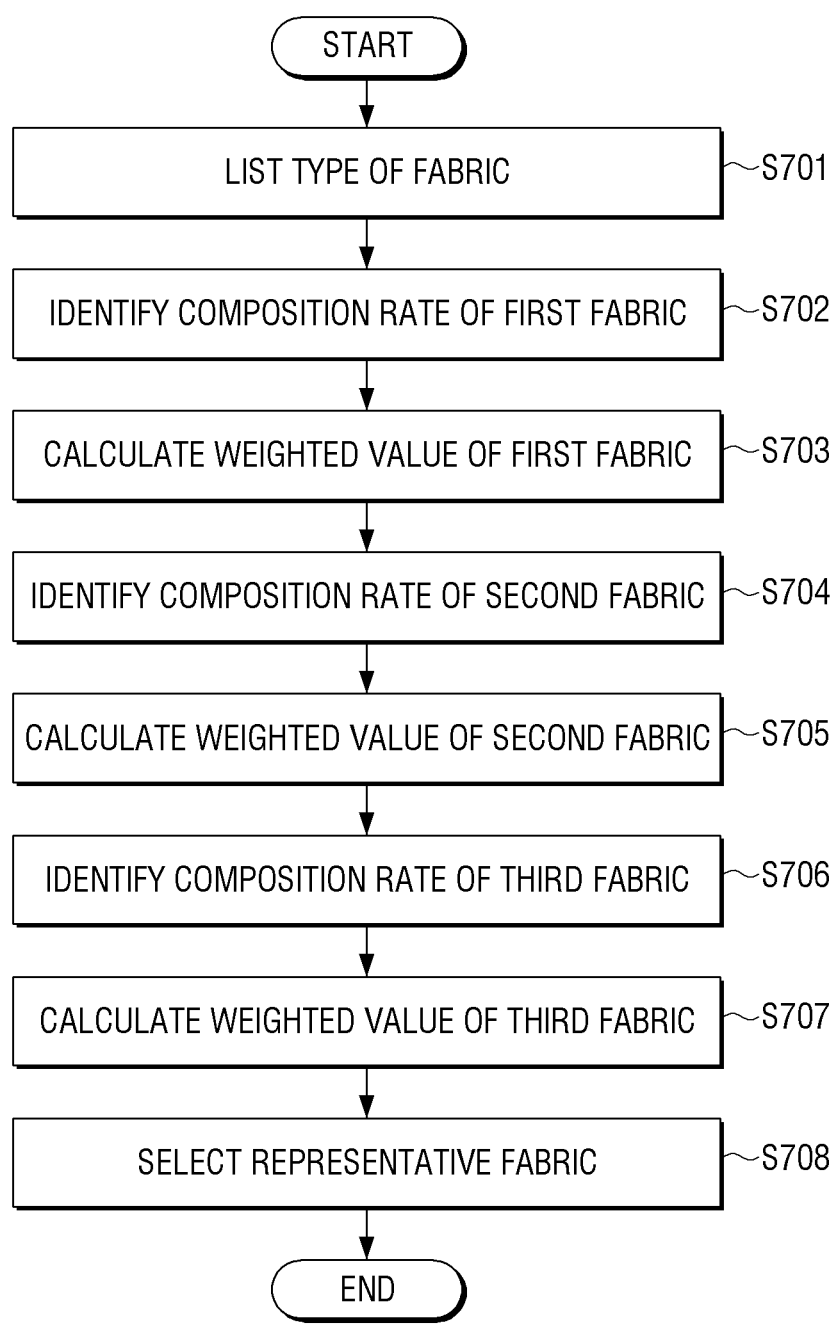

FIG. 8

| CLASSIFICATION OF FABRIC TYPE | WEIGHTED VALUE |
|---|---|
| Normal | 1 |
| Delicate | 2 |
| Rayon | 3 |
| Fur/leather | 4 |
| Silk | 5 |

FIG. 9

|  | NAME | TYPE | WEIGHTED VALUE | COMPOSITION RATE | SCORE |
|---|---|---|---|---|---|
| FIRST FABRIC | Wool | delicate | 2 | 10 | 20 |
| SECOND FABRIC | Nylon | normal | 1 | 70 | 70 |
| THIRD FABRIC | Polyester | normal | 1 | 20 | 20 |

FIG. 10

|  | NAME | TYPE | WEIGHTED VALUE | COMPOSITION RATE | SCORE |
|---|---|---|---|---|---|
| FIRST FABRIC | Wool | delicate | 2 | 70 | 140 |
| SECOND FABRIC | Silk | Silk | 5 | 20 | 100 |
| THIRD FABRIC | Nylon | normal | 1 | 10 | 10 |

CLOTHING TREATMENT DEVICE, ELECTRONIC APPARATUS, AND METHOD FOR CONTROLLING SAME

TECHNICAL FIELD

The disclosure relates to a clothing treatment apparatus and a method of controlling thereof. More particularly, the disclosure relates to a clothing treatment device that determines an appropriate clothing management method using cloth information of the clothing, and a method of controlling thereof.

BACKGROUND ART

Recently, as a device that conveniently treats or takes care of clothes separately from a washing machine, clothing treatment devices having a function of removing wrinkles or removing dust or odors from clothes without a separate washing process have been used.

In the related art, a clothing treatment apparatus has determined a clothing management method based on a common type of fabric and a mixture rate of fabrics according to the type of clothing (school uniform, dress, suit, etc.). However, this is a determination based on probability, so when a fabric type and mixture rate of an actual clothing are different from a conventional case, there has been a problem that the apparatus operates according to an inappropriate clothing management method.

DETAILED DESCRIPTION OF THE INVENTION

Technical Problem

An object of the disclosure is to provide a clothing treatment apparatus, an electronic apparatus, and a control method thereof for determining an appropriate clothing management method using cloth information of clothing.

Technical Solution

According to an embodiment of the disclosure, a clothing treatment apparatus includes a clothing support device configured to support or fix clothing inside an accommodation space of the clothing treatment, a spray device configured to spray steam or air on the clothing inside the accommodation space, a circulation device configured to circulate the air inside the accommodation space, a memory configured to store a plurality of clothing management methods, and operation information of the spray device and the circulation device for each clothing management method, and a processor configured to identify cloth information of the clothing inside the accommodation space, determine a clothing management method corresponding to the identified cloth information, from among the plurality of clothing management methods, and control the spray device and the circulation device based on the stored operation information corresponding to the determined clothing management method.

According to an embodiment of the disclosure, an electronic apparatus capable of being connected to a clothing treatment apparatus, the apparatus includes a communication device capable of communicating with the clothing treatment apparatus, a memory configured to store a plurality of indexes, cloth information for each of the plurality of indexes, a plurality of clothing management methods, and operation information of the clothing treatment apparatus for each of the plurality of clothing management methods, an input device configured to receive a selection of one index among the plurality of indexes from a user, and a processor configured to identify the stored cloth information corresponding to the selected index, determine a clothing management method corresponding to the identified cloth information from among the plurality of clothing management methods, and control the communication device to transmit the stored operation information corresponding to the determined clothing management method to the clothing treatment apparatus.

According to an embodiment of the disclosure, a method of controlling a clothing treatment apparatus including a spray device and a circulation device, the method includes storing a plurality of clothing management methods, and operation information of the spray device and the circulation device for each clothing management method, identifying cloth information of the clothing inside an accommodation space of the clothing treatment apparatus, determining a clothing management method corresponding to the identified cloth information, from among the plurality of clothing management methods, and controlling the spray device and the circulation device based on the stored operation information corresponding to the determined clothing management method.

BRIEF DESCRIPTION OF DRAWINGS

FIG. 6 is a diagram illustrating an example of a clothing management method mapping table;

FIGS. 7 and 8 are views illustrating a method of selecting a representative fabric;

FIG. 9 is a view illustrating an operation of selecting a representative fabric according to a first embodiment;

FIG. 10 is a view illustrating a selection operation of a representative fabric according to a second embodiment;

MODE FOR IMPLEMENTING THE DISCLOSURE

The terms used in example embodiments will be briefly explained, and example embodiments will be described in greater detail with reference to the accompanying drawings.

Terms used in the disclosure are selected as general terminologies currently widely used in consideration of the configuration and functions of the disclosure, but can be different depending on intention of those skilled in the art, a precedent, appearance of new technologies, and the like. Further, in specific cases, terms may be arbitrarily selected. In this case, the meaning of the terms will be described in the description of the corresponding embodiments. Accordingly, the terms used in the description should not necessarily be construed as simple names of the terms, but be defined based on meanings of the terms and overall contents of the disclosure.

The example embodiments may vary, and may be provided in different example embodiments. Various example embodiments will be described with reference to accompanying drawings. However, this does not necessarily limit the scope of the exemplary embodiments to a specific embodiment form. Instead, modifications, equivalents and replacements included in the disclosed concept and technical scope of this specification may be employed. While describing exemplary embodiments, if it is determined that the specific description regarding a known technology obscures the gist of the disclosure, the specific description is omitted.

The terms such as "first," "second," and so on may be used to describe a variety of elements, but the elements should not be limited by these terms. The terms used herein are solely intended to explain specific example embodiments, and not to limit the scope of the disclosure.

Singular forms are intended to include plural forms unless the context clearly indicates otherwise. The terms "include", "comprise", "is configured to," etc., of the description are used to indicate that there are features, numbers, steps, operations, elements, parts or combination thereof, and they should not exclude the possibilities of combination or addition of one or more features, numbers, steps, operations, elements, parts or a combination thereof.

The example embodiments of the disclosure will be described in greater detail below in a manner that will be understood by one of ordinary skill in the art. However, exemplary embodiments may be realized in a variety of different configurations, and not limited to descriptions provided herein. In addition, parts which are not related to the description are omitted to clearly describe the disclosure.

Hereinafter, the disclosure will be described in detail with reference to accompanying drawings.

Figure 1:
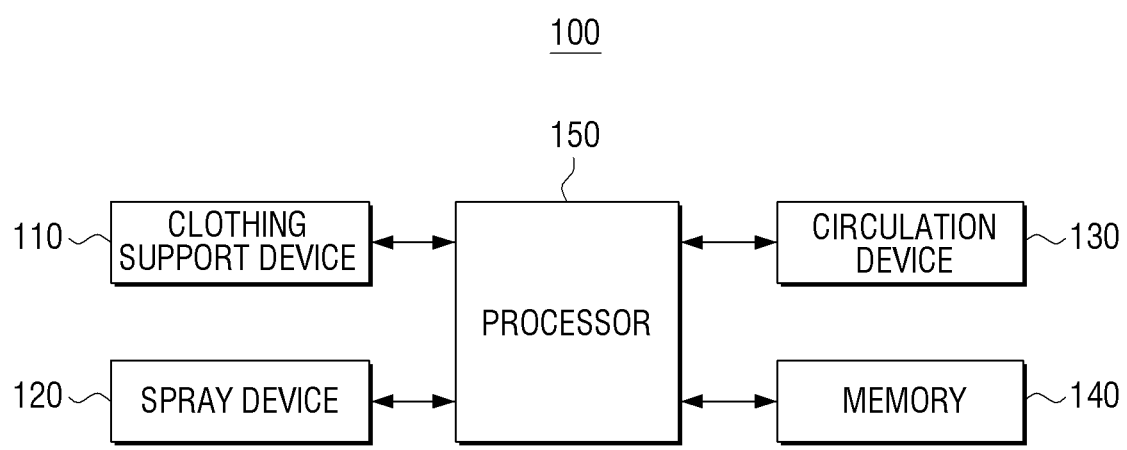
FIG. 1 is a block diagram illustrating a configuration of a clothing treatment apparatus according to an embodiment of the disclosure.

FIG. 1 is a block diagram illustrating a configuration of a clothing treatment apparatus according to an embodiment of the disclosure.

Referring to FIG. 1, a clothing treatment apparatus 100 includes a clothing support device 110, a spray device 120, a circulation device 130, a memory 140, and a processor 150.

The clothing support device 110 is disposed in an accommodation space capable of accommodating clothing of the clothing treatment apparatus 100 to support or fix the clothing. The clothing support device 110 may be disposed at the top of the accommodation space and used for hanging clothes. In addition, the clothing support device 110 may be fully taken out completely separated from the accommodation space, and may be brought back into the accommodation space in a state of supporting clothing from the outside of the clothing treatment apparatus 100.

The spray device 120 sprays steam or air on the clothing inside the accommodation space. Specifically, the spray device 120 may spray high-temperature steam to change a fabric structure of clothes into a flexible state. In addition, the spray device 120 may spray compressed air to compress clothes and remove wrinkles or dust from the clothes.

In addition, the spray device 120 may be installed to be movable up and down along the accommodation space, and may evenly spray steam or air while moving vertically. Meanwhile, an installation location of the spray device 120 is not limited to the above-described example.

The circulation device 130 circulates the air in the accommodation space. Specifically, the circulation device 130 may continuously circulate hot air in the accommodation space by introducing high-temperature air into the accommodation space and re-inhaling the air introduced into the accommodation space.

The circulation device 130 may maintain the fabric structure of clothes in a flexible state by continuously circulating the hot air in the accommodation space, and dry the clothes by removing moisture present in the clothes.

The circulation device 130 may include a heating member to generate hot air, and the heating member may be formed of a heating coil or the like.

Also, the circulation device 130 may be disposed at a bottom of the accommodation space to circulate air in the accommodation space. Meanwhile, the installation location of the circulation device 130 is not limited to the example described above.

The memory 140 stores various data for the overall operation of the clothing treatment apparatus 100 such as a program for treating or controlling the processor 150. Specifically, the memory 140 may store a plurality of application programs driven by the clothing treatment apparatus 100 and data and commands for operating the electronic apparatus 200.

The memory 140 may be accessed by the processor 150, and perform readout, recording, correction, deletion, update, and the like, on data by the processor 150. For example, the memory 140 may be implemented to be an external storage medium, a removable disk that includes a Universal Serial Bus (USB) memory, and/or a web server through a network as well as a storage medium within the electronic apparatus 200.

In addition, the memory 140 may store information on a plurality of clothing management methods. Specifically, the memory 140 may store a plurality of clothing management methods, and operation information of the spray device and the circulation device for each clothing management method.

Herein, the clothing management method refers to a method of performing a plurality of functions of the clothing treatment apparatus that is performed on the clothes disposed inside the accommodation space in the clothing treatment apparatus. A type of fabrics and a mixture rate of fabrics included in each clothing are different, and a required management method is different according to the type and mixture rate of fabrics. Therefore, an individual clothing management method is required in consideration of the type and mixture rate of fabrics of each clothing.

For example, in the case of clothes made of silk or velvet, when high-temperature heat is applied, side effects such as size reduction, pattern change, gloss loss, etc. may occur. Therefore, the clothing management method needs to care these features of clothing.

The plurality of functions refer to functions such as heating, steam, drying, dust removal or the like performed on clothes subject to be managed. A detailed description of functions such as heating, steam, drying, dust removal will be described later with reference to FIG. 3.

Meanwhile, as described above, since a required function may be different depending on the type of fabric, each of the plurality of clothing management methods may vary whether or not to perform each of the plurality of functions such as heating, steam, drying, dust removal.

For example, in the case of a clothing management method corresponding to clothing that is not denatured at high temperatures, it may be set to perform all functions of heating, steam, drying, dust removal. Meanwhile, in the case of a clothing management method corresponding to clothing that may be denatured at high temperatures, it may be set to perform only heating, drying, dust removal functions except for the steam function.

In addition, each of the plurality of clothing management methods may vary not only whether or not to perform each of the plurality of functions such as heating, steam, drying, dust removal, but also a method of executing. Specifically, settings for air temperature, an intensity of discharging air, function execution time, etc. directly related to the execution method of each of the plurality of functions may be changed.

For example, in the case of a clothing management method corresponding to clothing of a weak material such as silk, when performing a steam function or a dust removal function, it may be set to discharge air of a weak intensity. In addition, in the case of a clothing management method corresponding to clothing that may be denatured when exposed to continuous heat, a temperature of exhausted air may be set to be low and set to perform a function for a short time when a steam function is performed.

In addition, operation information of the spray device and the circulation device for each of the plurality of clothing management methods refer to information on specific operating conditions of the spray device and the circulation device for performing the heating, steam, drying, dust removal functions described above.

Specifically, since the spray device 120 may spray steam and compressed air, the apparatus may perform a steam function and a dust removal function, and the circulation device 130 may circulate high-temperature air, and thus, a heating and drying function may be performed. Therefore, it is possible to change the method of executing heating, steam, drying, dust removal functions by changing operating conditions of the spraying apparatus 120 and the circulation device 130.

As described above, since various combinations of heating, steam, drying, dust removal functions may be generated through changes in specific operating conditions of the spraying apparatus 120 and the circulation device 130, a plurality of clothing management methods may be generated.

In addition, when appropriately combining the functions described above in consideration of materials or contents of the clothing, a clothing management method appropriate for each clothing may be generated. Meanwhile, the functions performed in the clothing management method are not limited to heating, steam, drying, dust removal functions.

The processor 150 controls each component in the clothing treatment apparatus 100. Specifically, the processor 150 may control an operation of a component related to a specific function. For example, the processor 150 may control the operation of the spray device 120 when a steam function is required, and may control the operation of the circulation device 130 when a drying function is required.

In addition, the processor 150 may identify clothes subject to be managed. For example, when an input device is provided in the clothing treatment apparatus 100, and information on a plurality of clothes is stored in the memory 140, the user may select one of the plurality of clothes for the processor 150 through the input device.

As another example, when a communication device is provided in the clothing treatment apparatus 100, the processor 150 may receive information on the selected clothes among the plurality of clothes from an external device through the communication device.

As another example, the clothing treatment apparatus 100 may include a photographing device, and the memory 140 may store a plurality of clothes images and clothes information for each of the plurality of clothes images. In this case, the processor 150 may determine a clothes image corresponding to the photographed image from among the plurality of clothes images by using the image photographed by the photographing device, and identify information on clothes corresponding to the determined clothes image. A detailed description of identifying clothes subject to be managed by using the photographing device and determining a clothing management method will be described later with reference to FIG. 17.

Meanwhile, the method that the processor 150 may identify clothes subject to be managed is not limited to the method described above.

In addition, the processor 150 may identify cloth information of clothes subject to be managed. The cloth information refers to information including information on the types of fabrics included in each clothing and the mixture rate of each type of fabrics. In addition, information such as a purchase date, a previous clothing management history or the like may be included in addition to the information on the type and mixture rate of fabrics.

For example, when cloth information for a plurality of clothes is stored in the memory 140, the processor 150 may identify the cloth information of clothes subject to be managed among the stored cloth information.

As another example, when a communication device is provided in the clothing treatment apparatus 100, the processor 150 may receive the cloth information of the clothes subject to be managed from an external device through the communication device 170 to identify cloth information of the clothes subject to be managed.

As another example, when the photographing device is provided in the clothing treatment apparatus 100, the photographing device may photograph a label of the clothes subject to be managed, and the processor 150 may obtain cloth information using the photographed image.

Specifically, when the type of fabric and the mixture rate information are written on the label, the processor 150 may obtain the cloth information by recognizing a character representing the information on the type and mixture rate of the fabric from the label image.

In addition, when barcode information is written on the label, the processor 150 may extract the barcode information, transmit the extracted barcode information to an external server, and receive cloth information corresponding to the barcode information from the external server. Meanwhile, a detailed description of the operation of acquiring cloth information using the photographing device will be described below with reference to FIG. 11.

In addition, the processor 150 may determine a clothing management method corresponding to the identified cloth information among a plurality of clothing management methods. Specifically, the processor 150 may determine a representative fabric based on the information on the type and mixture rate of the fabric included in the cloth information, and determine a clothing management method based on the determined representative fabric.

For example, the processor 150 may determine a fabric type having the highest mixture rate among fabric types as a representative fabric, and may determine a clothing management method that is most optimized for the determined representative fabric.

As another example, the processor 150 may determine a representative fabric in consideration of both a weight and a mixture rate corresponding to each fabric type, and determine a clothing management method most optimized for the determined representative fabric. A detailed description of this will be described below with reference to FIGS. 7 to 9.

As another example, when a fabric type that requires special management such as silk is included among the fabric types, the processor 150 may determine a representative fabric in consideration of a mixture rate of the corresponding type, and determine the most optimized clothing management method for the determined representative fabric. A detailed description of this will be described below with reference to FIG. 10.

When a representative fabric is determined, the processor may determine not just one type but a predetermined number of a representative fabric, and determine the most optimized clothing management method in consideration of the determined predetermined number of all representative fabrics.

Meanwhile, a method of determining a clothing management method corresponding to the identified cloth information among the plurality of clothing management methods is not limited to the embodiment described above.

In addition, the processor 150 may control the operation of the clothing treatment apparatus 100 depending on the determined clothing management method. Specifically, the processor 150 may identify operation information of the spray device 120 and the circulation device 130 corresponding to the determined clothing management method among the operation information of the spray device 120 and the circulation device 130 stored in the memory 140. In addition, the processor 150 may control the spray device 120 and the circulation device 130 based on the identified operation information.

Meanwhile, although only a simple configuration constituting the clothing treatment apparatus has been illustrated and described, various configurations may be additionally provided during implementation. This will be described hereinafter with reference to FIG. 2.

Figure 2:
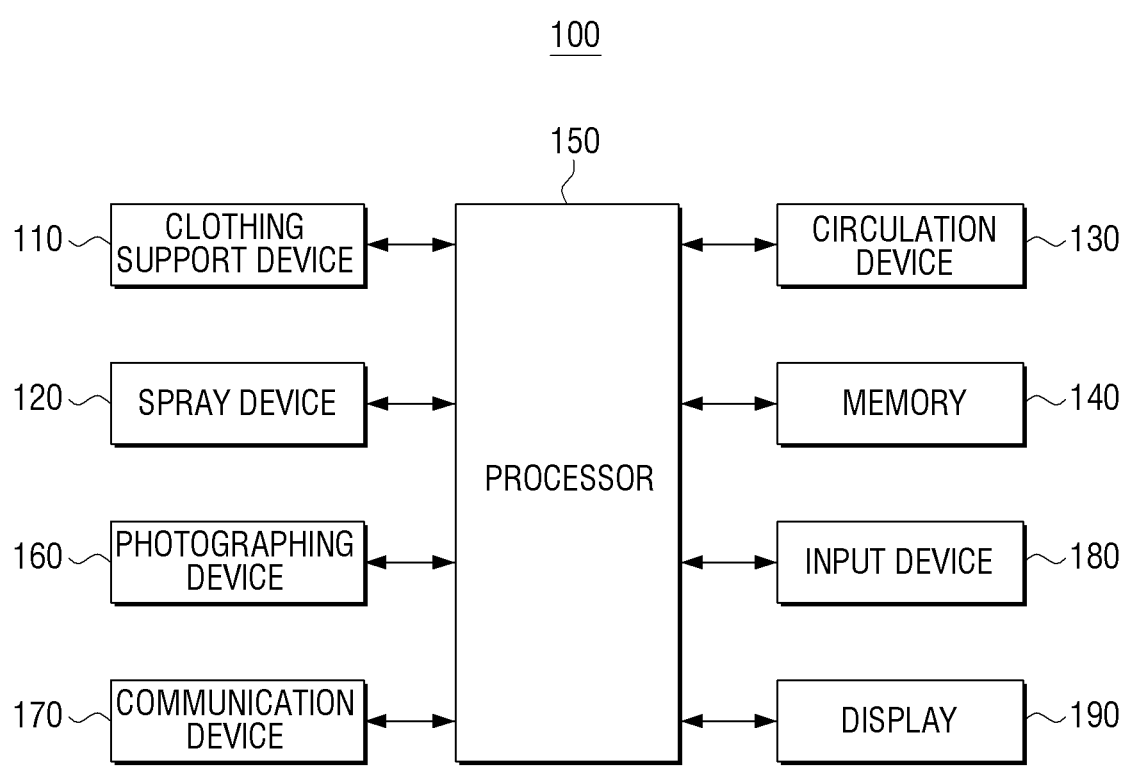
FIG. 2 is a block diagram illustrating a detailed configuration of a clothing treatment apparatus according to an embodiment of the disclosure.

FIG. 2 is a block diagram illustrating a detailed configuration of a clothing treatment apparatus according to an embodiment of the disclosure.

Referring to FIG. 2, the clothing treatment apparatus 100 may include a clothing support device 110, a spray device 120, a circulation device 130, a memory 140, a processor 150, a photographing device 160, and a communication device. 170, an input device 180 and a display 190.

The clothing support device 110, the spray device 120, the circulation device 140, the memory 140 and the processor 150 perform the same functions as those of the configurations of FIG. 1, and thus duplicate explanation thereof will be omitted.

The photographing device 160 may photograph a subject and generate a photographed image. Specifically, the photographing device 160 may include a lens which collects light of a subject and causes an optical image to be formed on a photographing area, a photographing element which photo-electrically converts light entered through a lens, and an AD converter which converts an analog signal of a photographing unit to a digital signal and outputs the converted signal. In this case, the photographing unit may be a Charge Coupled Device (CCD) photographing element or a Complementary Metal Oxide Semiconductor (CMOS) photographing element.

In addition, the photographing device 160 may be attached to a door of the clothing treatment apparatus 100 to photograph a label of clothes to generate a label image. The processor 150 may obtain cloth information of clothes using the photographed label image.

In addition, the photographing device 160 may photograph the clothes and generate an image of the clothes. If images of the plurality of clothes of the user are pre-stored in the memory 140, the processor 150 may compare the photographed clothes images with the plurality of clothes images stored in the memory 140 to identify the corresponding clothes images, thereby obtaining information on clothes subject to be managed.

Meanwhile, the location where the photographing device 160 is attached is not limited to the door of the clothing treatment apparatus 100 and may be disposed inside the accommodation space of the clothing treatment apparatus 100.

The communication device 170 may be connected to an external device (not shown), and may transmit and receive various data from the external device. Specifically, the communication device 140 is formed to connect to an external device through not only a local area network (LAN) or the Internet, and may also be connected to the external device through universal serial bus (USB) port or a wireless communication (e.g., Wi-Fi 802.11a/b/g/n, NFC, or Bluetooth) port. The external device may be a PC, a notebook, a smal tphone, a server, or the like.

In addition, the communication device 170 may receive information on clothes subject to be managed, cloth information, a method of managing the clothes, operation information of the spray device 120 and the circulation device 130 corresponding to the method of managing the clothes, or the like.

The input device 180 may receive a function selection and a control command for the corresponding function from the user. The function may include a heating function, a steam function, a drying function, a dust removal function, or the like, but is not limited thereto.

The input device 180 may receive an input of clothes subject to be managed from among a plurality of clothes from the user. Specifically, the input device 180 may receive an index corresponding to the managed clothes from among a plurality of indexes corresponding to each of the plurality of clothes from the user. In addition, the processor 150 may identify cloth information corresponding to the input index.

The index refers to an indication that designates each of the plurality of clothes of the user. For example, an index of a yellow winter coat may be indicated as "yellow coat", and an index of a blue knit may be indicated as "blue knit".

In addition, the index may be simply indicated by numbers, alphabets, or the like. For example, you could mark the yellow winter coat as 1 and the blue knit as 2. Meanwhile, the method of displaying the index is not limited thereto.

Accordingly, the input device 180 may receive an index (e.g., a yellow coat or 1) corresponding to a clothing subject to be managed from the user, and the processor 150 may identify cloth information (e.g., cloth information of the yellow coat or 1) corresponding to the input index.

If a plurality of indexes are displayed through the display 190, the user may select an index corresponding to the clothes subject to be managed instead of directly inputting the index corresponding to the clothes subject to be managed using the input device 180. The processor 150 may identify cloth information corresponding to the selected index.

In addition, the input device 180 may receive cloth information of each clothing from the user. Specifically, the input device 180 may receive information on types of fabrics included in each clothing and a mixture rate of each type of fabrics from the user. In addition, the processor 150 may store the input cloth information and an index corresponding thereto in the memory 140.

The display 190 may display various information provided from the clothing treatment apparatus 100. Specifically, the display 190 may display a user interface window for selecting various functions provided in the clothing treatment apparatus 100. The display 190 may be a monitor, such as LCD, CRT, or OLED and may be implemented by a touch screen that may simultaneously perform the function of the apparatus 180 described above.

As described above, the clothing treatment apparatus 100 according to the embodiment of the disclosure does not determine a clothing management method according to the type of clothing such as a suit or a dress, but a clothing management method in consideration of the type and mixture rate of fabrics included in an actual clothing.

Therefore, the apparatus 100 may more accurately identify what functions are actually required for clothes compared to a case of determining a clothing management method based on the type and mixture rate of conventional fabrics according to the type of clothing, and has an effect of reducing the problem that causes damage to clothes due to an inappropriate function.

Figure 3:
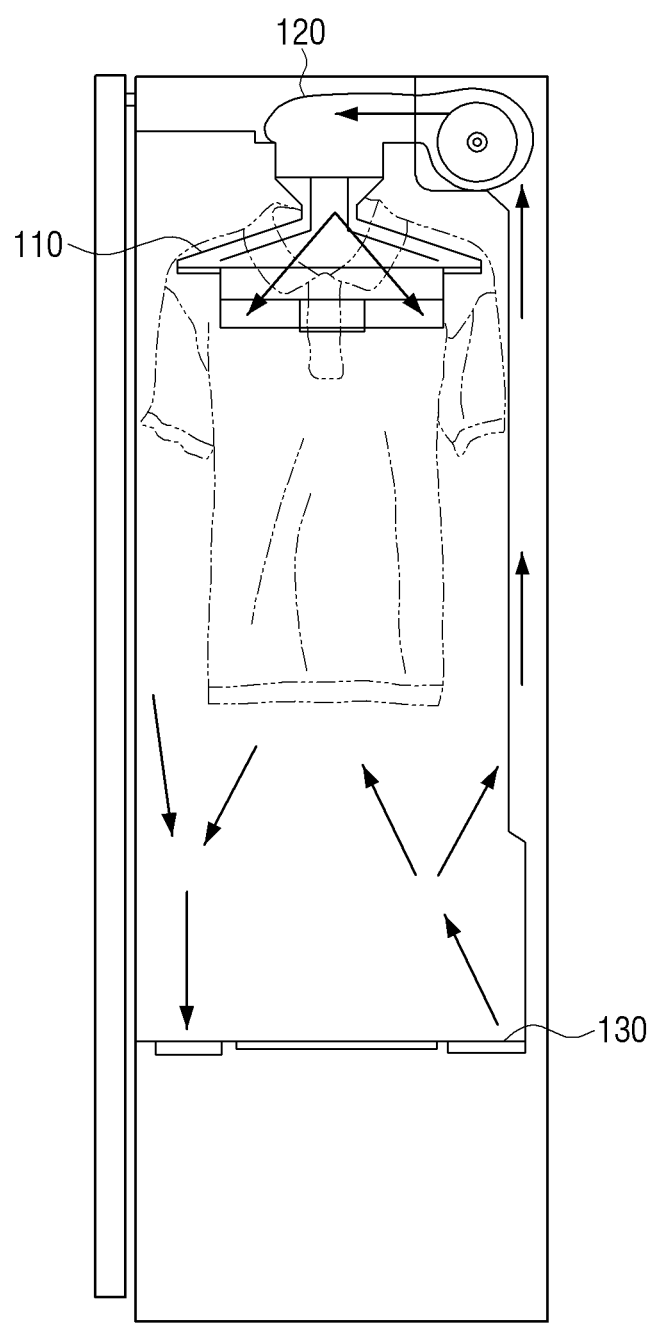
FIG. 3 is a view illustrating a plurality of functions of a clothing treatment apparatus according to an embodiment of the disclosure.

FIG. 3 is a view illustrating a plurality of functions of a clothing treatment apparatus according to an embodiment of the disclosure.

The clothes treatment apparatus 100 is a clothing support device disposed on an upper portion of the accommodation space, and may perform predetermined functions for treating clothes by using the spray device 120 and the circulation device 130 while the clothes are supported and fixed.

Specifically, the clothing treatment apparatus 100 may perform a clothing management operation in the order of heating, steam, drying, dust removal functions using the spray device 120 and the circulation device 130.

The heating function is a function of inflowing high-temperature air into the accommodation space using the circulation device 130 disposed in a lower part of the accommodation space, and allowing the inflow of high-temperature air to change the fabric of clothes into a flexible state. As the fabric texture of the clothes changes to a flexible state, an effect of a subsequent steam function may increase.

In addition, the steam function is a function of spraying high-temperature steam or compressed air onto clothes using the spray device 120, and is a function of simultaneously applying pressure to the front and rear surfaces of the clothes. This function may compress the clothes. In this case, the spray device 120 may be disposed on the side of the accommodation space, and may spray steam or compressed air onto clothes while moving vertically.

Alternatively, as shown in FIG. 3, when the spray device is connected to the clothing support device 110, the steam function may be implemented in a way in which the steam sprayed by the spray device 120 reaches clothes hung on the clothing support device 110 through the clothing support device 110, thereby compressing the clothes Specifically, air discharged from the circulation device 130 disposed at the lower portion of the accommodation space may be sucked by a suction port disposed on one side of the accommodation space, and the sucked air may move to the upper portion of the accommodation space and be discharged through the spray device 120 connected to the clothing support device 110.

In this case, the steam function may be performed using at least one of the circulation device 130 disposed at the lower portion and the spray device 120 disposed at the upper portion. For example, it may be set to discharge only air at the lower portion by the circulation device 130, or the lower air by the circulation device 130 may be weakly discharged, but air at the upper portion by the spray device 120 may be strongly discharged, or may be set to discharge both the air by the circulation device 130 and the spray device 120, but with a weak intensity.

In addition, the drying function is a function of removing moisture remaining on clothes by introducing hot air into the accommodation space using the circulation device 130.

In addition, the dust removal function is a function of removing dust from clothes caught in the clothing support device 110 by rapidly moving the clothing support device 110 right and left or back and forth.

Alternatively, as shown in FIG. 3, when the spray device 120 is connected to the clothing support device 110, the dust removal function may be implemented in a way that a high-pressure air sprayed by the spray device 120 reaches to clothes hung on the clothing support device 110 through the clothing support device 110, thereby removing dust from the clothes.

Specifically, air discharged from the circulation device 130 disposed at the lower portion of the accommodation space may be sucked by a suction port disposed on one side of the accommodation space, and the sucked air may move to the upper portion of the accommodation space and be discharged through the spray device 120 connected to the clothing support device 110.

In this case, the dust removal function may be performed using at least one of the circulation device 130 disposed at the lower portion and the spray device 120 disposed at the upper portion. For example, it may be set to discharge only air at the lower portion by the circulation device 130, or the lower air by the circulation device 130 may be weakly discharged, but air at the upper portion by the spray device 120 may be strongly discharged, or may be set to discharge both the air by the circulation device 130 and the spray device 120, but with a weak intensity.

Meanwhile, the functions used by the clothing treatment apparatus 100 to perform the clothing management operation are not limited to heating, steam, drying, dust removal functions, and the order of each function is also not limited the examples described above.

Meanwhile, when illustrating and describing FIG. 3, it is described and illustrated as having one clothing support device 110, one spray device 120, or one circulation device 130, but during implementation, a plurality of clothing support devices 110, a plurality of spray devices 120 or a plurality of circulation devices 130 may be provided.

In addition, when illustrating and describing FIG. 3, it is described that the clothing support device 110 has a shape of a general hanger, but is not limited thereto during implementation, and a shape capable of supporting clothing is sufficient.

Figure 4:
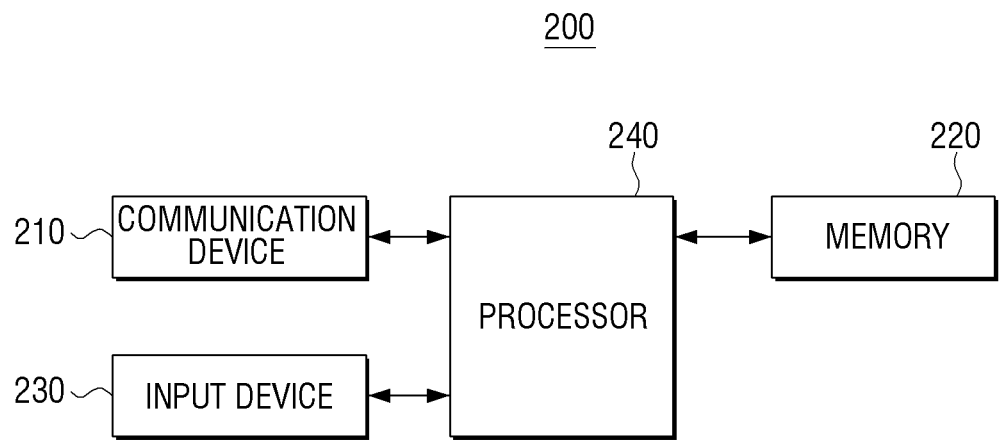
FIG. 4 is a view illustrating a simple configuration of an electronic apparatus according to an embodiment of the disclosure.

FIG. 4 is a view illustrating a configuration of an electronic apparatus according to an embodiment of the disclosure.

Referring to FIG. 4, the electronic apparatus 200 includes a communication device 210, a memory 220, an input device 230, and a processor 240.

The electronic apparatus 200 is connected to the clothing treatment apparatus 100 to determine a clothing management method to be performed in the clothing treatment apparatus 100. In this embodiment, the electronic apparatus 200 may be a PC, a notebook, a smart phone, a server, or the like.

The communication device 210 is connected to the clothing treatment apparatus 100, and may transmit and receive various data from the clothing treatment apparatus 100. Specifically, the communication device 210 is not only connected to an external device through a local area network (LAN) and an Internet network, but also a universal serial bus (USB) port or wireless communication (e.g., Wi-Fi 802.11a/b/g/n, NFC, Bluetooth) port is also possible.

In addition, the communication device 210 may receive information on clothes subject to be managed by an external device, cloth information, or the like according to various embodiments of the disclosure.

The memory 220 stores various data for overall operation of the electronic apparatus 200 such as a program for processing or controlling the processor 240. Specifically, the memory 220 may store a plurality of application programs driven by the electronic apparatus 200 and data and commands for the operation of the electronic apparatus 200.

The memory 140 may be accessed by the processor 150, and perform readout, recording, correction, deletion, update, and the like, on data by the processor 150. For example, the memory 140 may be implemented to be an external storage medium, a removable disk that includes a Universal Serial Bus (USB) memory, and/or a web server through a network as well as a storage medium within the electronic apparatus 200.

In addition, the memory 220 may store a plurality of indexes for each of a plurality of clothes, and may store cloth information of clothes corresponding to each of the plurality of indexes. The cloth information refers to information including information on the types of fabrics included in each clothing and the mixing ratio of each type of fabrics. In addition, information such as a purchase date, a previous clothing management history or the like may be included in addition to the information on the type and mixture rate of fabrics.

In addition, the memory 220 may store information on a plurality of clothes management methods. Specifically, the memory 220 may store operation information of a spray device and a circulation device for each of a plurality of clothes management methods and a plurality of clothes management methods. Since the operation information of the spray device and the circulation device for each of the plurality of clothes management methods and the plurality of clothes management methods is the same as described above with respect to the clothing treatment apparatus 100, a duplicate description will be omitted.

The input device 230 may receive a control command for a function section and a corresponding function from the user. The function may include a heating function, a steam function, a drying function, a dust removal function, or the like, but is not limited thereto.

In addition, the input device 230 may receive clothes subject to be managed among a plurality of clothes from the user. Specifically, the input device 230 may receive an index corresponding to a clothes subject to be managed among a plurality of indexes corresponding to each of a plurality of clothes from the user. In addition, the processor 240 may identify cloth information corresponding to the input index.

In addition, the input device 230 may receive cloth information of each clothing from the user. Specifically, the input device 230 may receive information on the types of fabrics included in each garment and a mixture rate of each type of fabrics from the user. In addition, the processor 240 may store the input cloth information and an index corresponding thereto in the memory 220.

The processor 240 controls each component in the electronic apparatus 200. In addition, the processor 240 may identify clothes subject to be managed. Specifically, the processor 240 may identify cloth information corresponding to the index input from the user through the input device 230.

The processor 240 may identify clothes subject to be managed by receiving information on clothes subject to be managed among the plurality of clothes from the clothes treatment apparatus 100 through the communication device 210.

Alternatively, a photographing device may be provided in the electronic apparatus 200, and the memory 220 may store a plurality of clothes images and information on clothes for each of the plurality of clothes images. In this case, the processor 240 may determine a clothes image corresponding to the photographed image from among the plurality of clothes images by using the image photographed by the photographing device, and identify information on clothes corresponding to the determined clothes image. A detailed description of identifying clothes subject to be managed by using the photographing device and determining a clothes management method will be described later with reference to FIG. 17.

Meanwhile, the method for the processor 240 to identify clothes subject to be managed is not limited to the method described above.

In addition, the processor 240 may identify cloth information of clothes subject to be managed. For example, the processor 240 may identify the cloth information of clothes subject to be managed from among the stored cloth information.

As another example, the processor 240 may identify the cloth information of clothes subject to be managed by receiving cloth information of clothes subject to be managed from an external server through the communication device 210.

As another example, when a photographing device is provided with the electronic apparatus 200, the photographing device 250 may photograph a label of clothes subject to be managed, and the processor 240 may obtain cloth information using the photographed image.

Specifically, when information on a type of fabric and a mixture rate are written on the label, the processor 240 may obtain the cloth information by recognizing a character representing information on the type and mixture rate of the fabric from the label image. The processor 240 may store the obtained cloth information and an index corresponding to the photographed cloth in the memory 220.

When barcode information is written on the label, the processor 240 may extract the barcode information, transmit the extracted barcode information to an external server, and receive cloth information corresponding to the barcode information from the external server. The processor 240 may store the received cloth information and an index corresponding to the photographed cloth in the memory 220.

Meanwhile, a detailed description of the operation of obtaining cloth information using the photographing device will be described below with reference to FIG. 11.

In addition, the processor 240 may determine a clothing management method corresponding to the identified cloth information among a plurality of clothing management methods. Specifically, the processor 240 may determine a representative fabric based on the fabric type information and the mixture rate of the fabric included in the cloth information, and determine a clothing management method based on the determined representative fabric.

For example, the processor 240 may determine a fabric type having the highest mixture rate among fabric types as a representative fabric, and may determine a clothing management method that is most optimized for the determined representative fabric.

As another example, the processor 240 may determine a representative fabric in consideration of both a weighted value and a mixture rate corresponding to each fabric type, and determine a clothing management method most optimized for the determined representative fabric. A detailed description of this will be described below with reference to FIGS. 7 to 9.

As another example, when a fabric type that requires special management, such as silk, is included among the fabric types, the processor 240 may determine a representative fabric in consideration of a mixture rate of the type, and determine the most optimized clothing management method for the determined representative fabric. A detailed description of this will be described below with reference to FIG. 10.

Also, when determining a representative fabric, the processor 240 may determine not just one type but determine a predetermined number of representative fabric, and determine the most optimized clothing management method in consideration of the predetermined number of representative fabric.

Meanwhile, a method of determining a clothing management method corresponding to the identified cloth information among the plurality of clothing management methods is not limited to the embodiment described above.

In addition, the processor 240 may control the communication device 210 to identify operation information of the clothing treatment apparatus 100 corresponding to the determined clothing management method and transmit the identified operation information to the clothing treatment apparatus 100.

Meanwhile, although only a simple configuration that constitutes the electronic apparatus has been illustrated and described, various configurations may be additionally provided during implementation. This will be described below with reference to FIG. 5.

Figure 5:
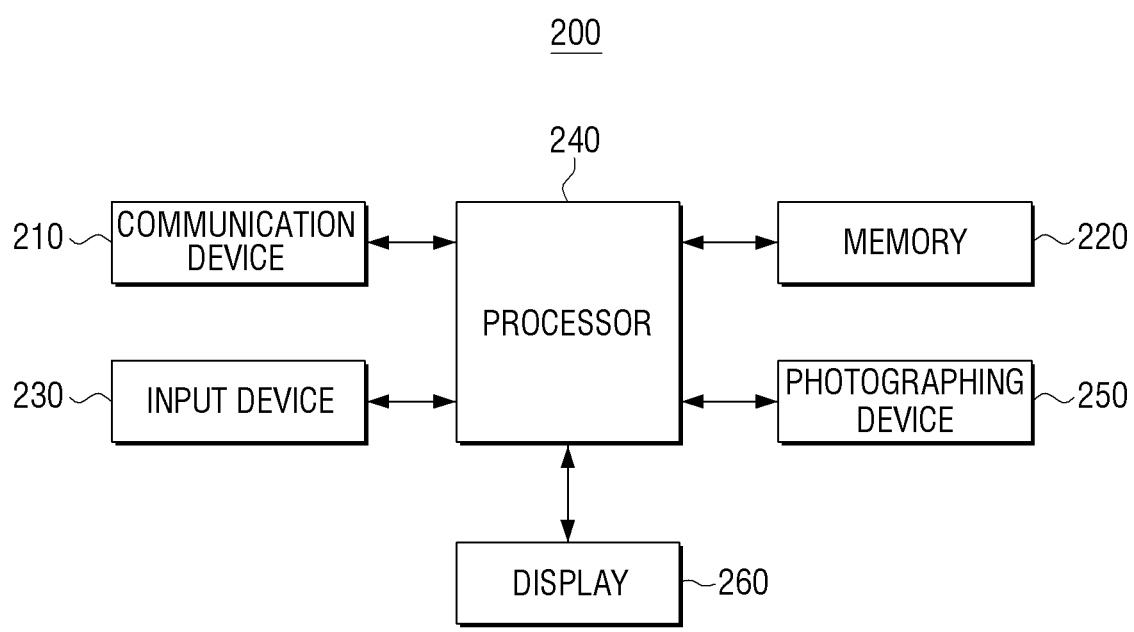
FIG. 5 is a block diagram illustrating a detailed configuration of an electronic apparatus according to an embodiment of the disclosure.

FIG. 5 is a block diagram illustrating a detailed configuration of an electronic apparatus according to an embodiment of the disclosure.

Referring to FIG. 5, the electronic apparatus 200 may include a communication device 210, a memory 220, an input device 230, a processor 240, a photographing device 250, and a display 260.

The communication device 210, the memory 220, the input device 230, and the processor 240 perform the same functions as those of the configurations of FIG. 4, and thus duplicate description thereof will be omitted.

The photographing unit 250 may photograph a subject and generate a photographed image. Specifically, the photographing unit 250 may include a lens which collects light of the subject and causes an optical image to be formed on a photographing area, a photographing element which photo-electrically converts light entered through a lens, and an A/D converter which converts an analog signal of a photographing unit to a digital signal and outputs the converted signal. In this case, the photographing unit may be a charge coupled device (CCD) photographing element or a complementary metal oxide semiconductor (CMOS) photographing element.

The photographing device 250 may generate a label image by photographing a label of clothes. The processor 240 may acquire cloth information of clothes by using the photographed label image.

In addition, the photographing device 250 may generate an image of the clothes by photographing the clothes. If images of a plurality of clothes of the user are pre-stored in the memory 220, the processor 240 may compare the photographed clothes image with the plurality of clothes images stored in the memory 220, and identify the corresponding clothes image, thereby obtaining information on clothes subject to be managed.

The display 260 may display various information provided by the electronic apparatus 200. Specifically, the display 260 may display a user interface window for selecting various functions provided in the electronic apparatus 200. The display 260 may be a monitor, such as LCD, CRT and OLED, and may be implemented by a touch screen that may simultaneously perform the function of the input device 230.

In addition, the display 260 may display a plurality of indexes corresponding to a plurality of clothes to the user, and may receive an index corresponding to one clothes from the user. The processor 240 may determine a clothing management method using cloth information corresponding to the selected index.

As described above, the electronic apparatus 200 according to the embodiment does not determine a clothing management method according to the type of clothing such as a suit, dress, or the like, but determine the clothing management method in consideration of a type and a mixture rate of fabrics included in the actual clothing.

Therefore, it may more accurately identify what functions are actually required for clothes compared to the case of determining a clothing management method based on the type and mixture rate of conventional fabrics according to the type of clothing, thereby reducing a problem that causes damage to clothing due to inappropriate functions.

FIG. 6 is a diagram illustrating an example of a clothing management method mapping table.

The clothing treatment apparatus 100 or the electronic apparatus 200 may determine a clothing management method corresponding to a clothing subject to be managed by using a clothing management mapping table. Detailed description for each item of the clothing management method mapping table is as described below.

Detailed types of fabrics "Matter Name" indicate specific names of various types of fabrics such as silk, down, rayon, or the like. Information obtained when the cloth information is obtained from the image that a clothing label is photographed is a type and a mixture rate of the fabric, and the fabric type corresponds to a fabric type item in the table.

In addition, a major classification of fabrics "FABRIC_NAME" is a group of fabrics with common characteristics among the detailed types of each fabric. The group may be composed of silk, fur and leather, delicate, and normal. Meanwhile, the type of group is not limited to the example described above.

The "FABRIC_PRIORITY" item includes priority information considering the characteristics of each group. The priority information has a different value for each group, and is determined in consideration of a general price and management difficulty of fabrics belonging to the group. Therefore, priority information may have a value of 1 in the case of silk belonging to high-end clothing.

In addition, an item of clothing management method "AVAIL_COURSE" includes clothing management methods in consideration of the characteristics of each group. For example, in the case of silk, the clothing treatment apparatus 100 may perform only a management operation corresponding to a clothing management method No. 13. Each clothing management method may differ in whether or not to perform each of a plurality of functions such as heating, steam, drying, dust removal, or the like, and a method of performing.

The processors 150 and 240 may determine a representative fabric by using cloth information of the clothes subject to be managed, and determine a clothing management method corresponding to the representative fabric. Meanwhile, a detailed description regarding a method of determining a representative fabric will be described below with reference to FIGS. 7 to 9.

For example, when a representative fabric is a synthetic leather, the synthetic leather is belonging to the fur_leather, and, its clothing management method corresponds to the No. 19, and thus the processor 150 and 240 may determine the clothing management method as No. 19.

When there are a plurality of representative fabrics, the clothing treatment apparatus 100 or the electronic apparatus 200 may determine a corresponding clothing management method using priority information. For example, when the representative fabrics are silk and nylon, the clothing management method corresponding to silk is No. 13, and the clothing management method corresponding to nylon is all No. 1 to 25. In this case, since the priority of silk is 1 and the priority of nylon is 4, the apparatus 100 may determine No. 13, which is a clothing management method corresponding to silk having a high priority, as the clothing management method.

In addition, when there are a plurality of clothing management methods corresponding to the representative fabric, the apparatus may receive one clothing management method among the plurality of clothing management methods from the user.

FIGS. 7 and 8 are views illustrating a method of selecting a representative fabric.

FIG. 7 is a flowchart illustrating an operation of selecting a representative fabric, and FIG. 8 is a view illustrating an example of weighted value information corresponding to a fabric type. The clothing treatment apparatus 100 or the electronic apparatus 200 may select a representative fabric by using cloth information of a clothing subject to be managed.

The types of fabrics included in clothes that are clothing targets may be listed S701. Specifically, the processors 150 and 240 may identify types of fabrics included in cloth information and information on a mixture rate of each type to list them.

A mixture rate of a first fabric may be identified S702. A score may be calculated using a weighted value corresponding to the type of the first fabric S703.

Specifically, the clothing treatment apparatus 100 or the electronic apparatus 200 may calculate a score by using weighted value information for each fabric type category shown in FIG. 8. More specifically, the score may be calculated by multiplying the weighted value and the mixture rate corresponding to the fabric type.

For example, when a first fabric is silk and a mixture rate is 50%, a weighted value corresponding to the silk is 5, and thus a score of 250 points may be calculated by multiplying the weighted value 5 by the mixture rate 50 of silk.

A mixture rate of a second fabric may be identified S704. In addition, a score may be calculated using a weighted value corresponding to the type of the second fabric S705. A method of calculating the score is the same as the method of calculating the score of the first fabric, and redundant descriptions are omitted.

Also, a mixture ratio of a third fabric may be identified S706. In addition, a score may be calculated using a weighted value corresponding to the type of the third fabric S707. The method of calculating the score is the same as the method of calculating the score of the first fabric, and redundant descriptions are omitted.

Meanwhile, when there are three or more types of fabrics included in clothes, scores may be calculated in the same manner for each of the remaining fabrics.

In addition, a representative fabric may be selected using the calculated score of each of the first to third fabrics S708. Specifically, the processors 150 and 240 may select a fabric having the highest score among the calculated scores of each of the first fabric to the third fabric as a representative fabric.

For example, when a score of the first fabric is 100 points, a score of the second fabric is 50 points, and a score of the third fabric is 90 points, the first fabric with the highest score may be selected as a representative fabric.

If there are a plurality of fabrics having the highest score, all of the plurality of fabrics may be selected as representative fabrics. Alternatively, a fabric having a high priority among the plurality of fabrics may be selected as the representative fabric. Meanwhile, the method of selecting a representative fabric using the calculated score is not limited the example described above.

Meanwhile, even when there are three or more types of fabrics included in clothes, the method of selecting the representative fabric may be applied in the same manner.

FIG. 9 is a view illustrating an operation of selecting a representative fabric according to a first embodiment.

Referring to FIG. 9, a table including information on name, type, weighted value, mixture rate, and score of first to third fabrics may be identified. The clothing treatment apparatus 100 and the electronic apparatus 200 may generate the table shown in FIG. 9 and select a representative fabric based on the table.

By referring to the tables of FIGS. 6 and 8, the type of the first fabric is wool, and is included in the delicate group and has a weighted value of 2. In addition, since a mixture rate is 10%, its score is 20 multiplied by 2 and 10.

Since the type of the second fabric is nylon, it is included in the normal group and has a weighted value of 1. Also, since a mixture rate is 70%, the score is 70 multiplied by 1 and 70.

Also, since the type of the third fabric is polyester, it is included in the normal group and has a weighted value of 1. Also, since the mixture rate is 20%, the score is 20 multiplied by 1 and 20.

Since the second fabric has the highest score among the first to third fabrics, the clothing treatment apparatus 100 or the electronic apparatus 200 may select the second fabric as a representative fabric.

FIG. 10 is a view illustrating a selection operation of a representative fabric according to a second embodiment.

The clothing treatment apparatus 100 or the electronic apparatus 200 may select a representative fabric based on the score calculated as described with reference to FIG. 9. However, when high-quality clothing such as silk is included, management may be necessary even when the mixture rate is relatively low.

If a predetermined type of fabric is included in the clothes subject to be managed, and the mixture rate of the fabric is equal to or greater than a predetermined mixture rate, the processors 150 and 240 may select a representative fabric even when the score of the predetermined type of fabric does not have the highest score.

For example, it may be set that the predetermined type is silk, and the predetermined mixture rate is 20%. Referring to FIG. 10, a score of wool which is the first fabric, has the highest score of 140, but since the second fabric which is silk has 20% of mixture rate, the processors 150 and 240 may select silk as a representative fabric. Alternatively, the first fabric and the second fabric having the highest score may be selected as the representative fabric together.

Alternatively, when a predetermined type of fabric is included by identifying whether the predetermined type of fabric is included in the clothes subject to be managed, the processors 150 and 240 may select a predetermined type of fabric as a representative fabric regardless of a mixture rate.

For example, the predetermined type may be set as silk. In this case, the processors 150 and 240 may directly select silk as a representative fabric simply by the fact that the clothes subject to be managed includes silk. Alternatively, it may be selected as a representative fabric along with other fabrics having the highest score.

Meanwhile, the method of selecting a representative fabric when a predetermined type is included is not limited to the example described above.

Figure 11:
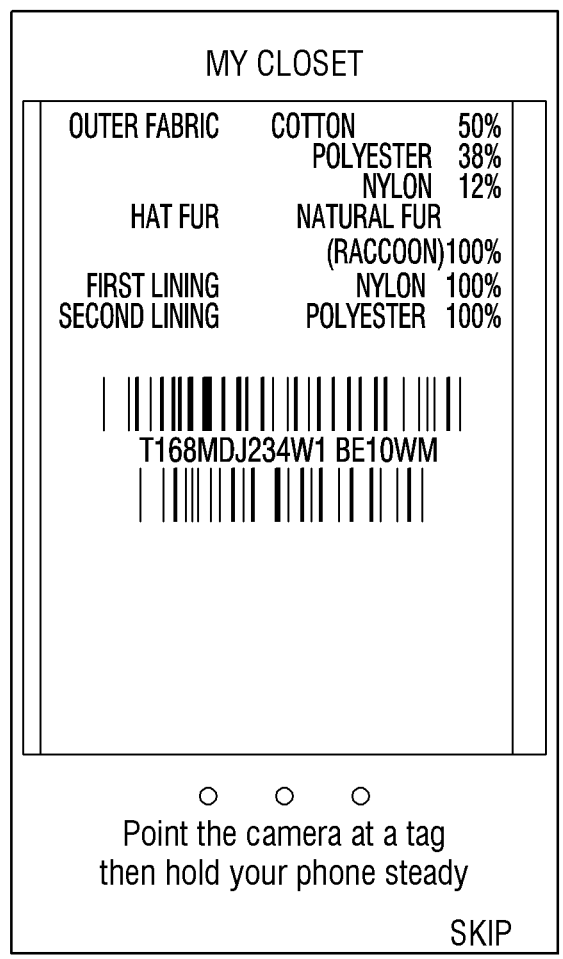
FIGS. 11 to 13 are views illustrating an operation of acquiring cloth information and providing a method of managing clothes.
Figure 12:
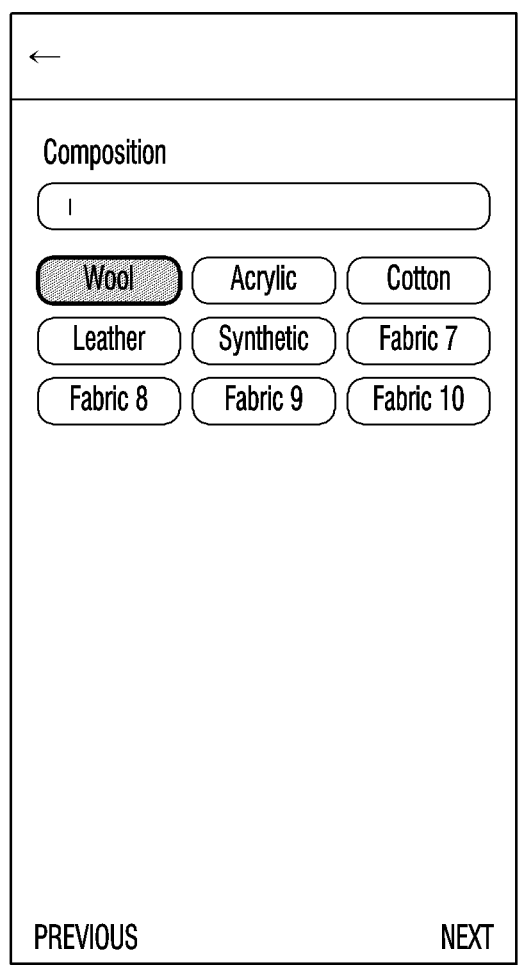
Figure 13:
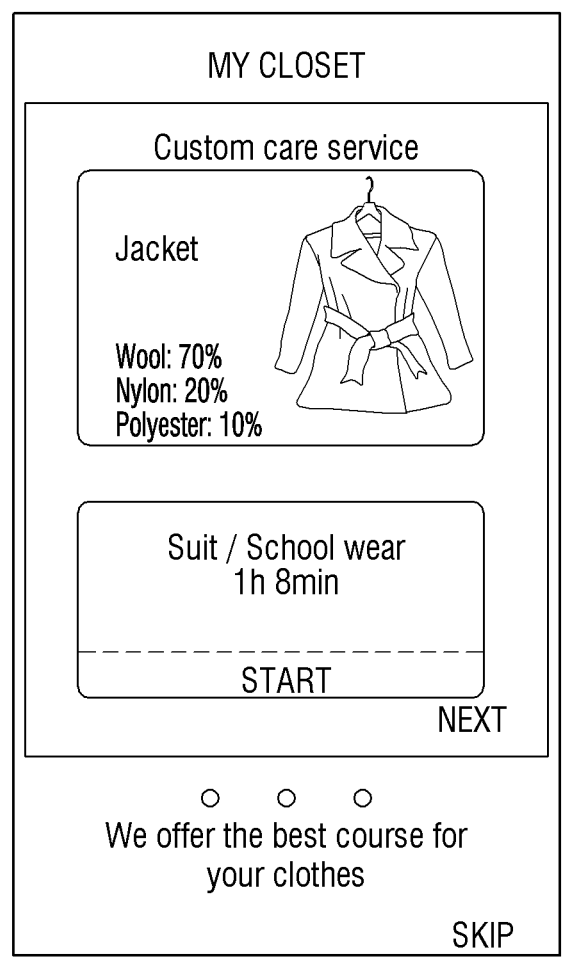

FIGS. 11 to 13 are views illustrating an operation of acquiring cloth information and providing a method of managing clothes.

FIG. 11 is a view illustrating an operation of obtaining cloth information using a photographing device.

When the clothing treatment apparatus 100 or the electronic apparatus 200 are provided with a photographing device, cloth information may be obtained from a label image of clothes photographed by the photographing device.

Specifically, the processors 150 and 240 may obtain cloth information by recognizing texts indicating information on a type and a mixture rate of fabric written on the label through an optical character recognition (OCR) method from the photographed image.

Referring to FIG. 11, the photographed clothes are made of 50% cotton, 38% polyester, and 12% nylon, and hat fur is made of 100% natural fur, and lining 1 is made of 100% nylon, and lining 2 is made of 100% polyester.

In this case, the processors 150 and 240 may obtain cloth information by distinguishing the cloth information for outer fabric, hat fur, lining 1 and lining 2, respectively, and may obtain information on the type and mixture rate of fabrics only without distinguishing outer fabric or the like. In this case, the processors 150 and 240 may obtain information 50% cotton, 38% polyester, 12% nylon, 100% natural fur, 100% nylon, and 100% polyester.

If barcode information is written in a photographed image, the processors 150 and 240 may extract the barcode information and transmit the barcode information to an external server. When the external server identifies cloth information corresponding to the barcode information and transmit it to the clothing treatment apparatus 100 or the electronic apparatus 200 again, the processors 150 and 240 may obtain the cloth information in a manner of receiving the cloth information. It may reduce a problem of character recognition errors that occur when obtaining cloth information through the OCR method by using barcode information.

FIG. 12 is a view illustrating an operation of obtaining cloth information through a user's input.

When the clothing treatment apparatus 100 or the electronic apparatus 200 includes an input device, cloth information input by the user may be obtained through the input device.

Specifically, when a plurality of fabric types are displayed on the display, the user may select a fabric type included in clothes among the fabric types and write a mixture rate of the corresponding type.

For example, referring to FIG. 12, the user may select wool among a plurality of the fabric types and directly write a composition rate of wool. When the composition is entered, the user may select the next fabric type and enter the composition rate of the selected fabric.

Meanwhile, the operation of obtaining cloth information through the user input is not limited to the example described above.

FIG. 13 is a view illustrating an example of cloth information and a display operation of a method for managing clothes.

Referring to FIG. 13, the clothing treatment apparatus 100 or the electronic apparatus 200 displays both information on clothes subject to be managed, and a method of managing clothes corresponding thereto.

Specifically, the clothing treatment apparatus 100 or the electronic apparatus 200 may display cloth information of clothes subject to be managed, obtained through the method described in FIG. 11 or 12. In addition, the apparatus may determine a clothing management method corresponding to the obtained cloth information and display information thereon.

For example, as shown in FIG. 13, cloth information indicating that the clothes subject to be managed is composed of 70% wool, 20% nylon, and 10% polyester may be displayed. In addition, the corresponding clothing management method is a suit/school wear-only clothing management method, and may display that the method is performed for a total of 1 hour and 8 minutes. In addition, it may display information on whether or not each of heating, steam, drying, dust removal functions of the clothing management method, and a method of performing.

If there are a plurality of clothing management methods corresponding to the cloth information, a plurality of clothing management methods may be displayed, and one clothing management method may be selected from the user.

Figure 15:
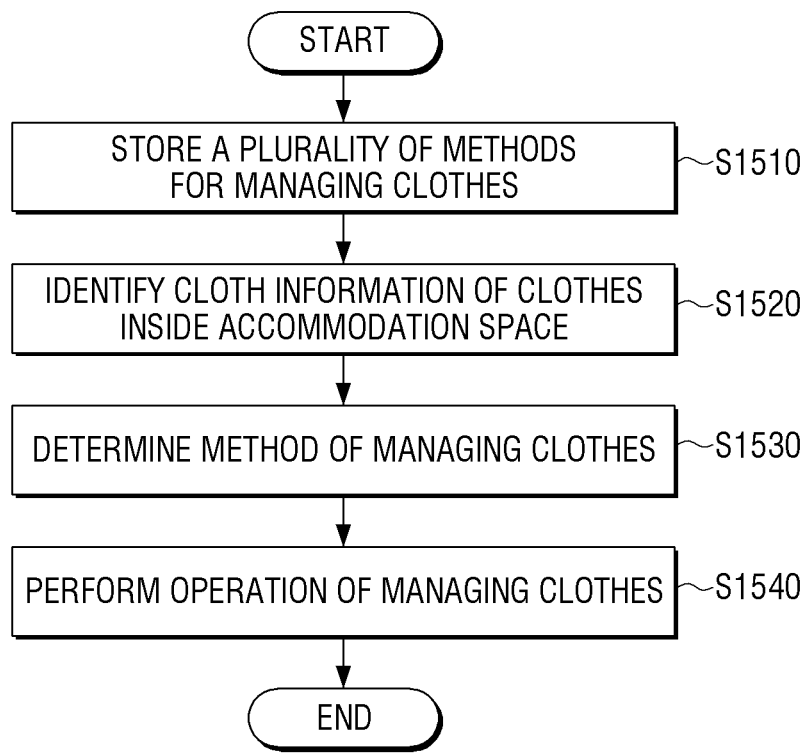
FIG. 15 is a flowchart illustrating a method of controlling a clothing treatment apparatus according to an embodiment of the disclosure.

FIG. 15 is a flowchart illustrating a method of controlling a clothing treatment apparatus according to an embodiment of the disclosure.

A plurality of clothing management methods are stored S1510. Specifically, a plurality of clothes management methods, and operation information of a spray device and a circulation device for each of the plurality of clothes management methods may be stored.

The cloth information of the clothes in an accommodation space is identified S1520. For example, when cloth information for the plurality of clothes is stored, the cloth information of the clothes subject to be managed from among the stored cloth information may be checked.

As another example, the cloth information of clothes subject to be managed may be identified by receiving the cloth information of clothes subject to be managed from an external device.

As another example, a label of clothes may be photographed, and cloth information may be obtained using the photographed image. Specifically, when information on a type and composition rate of fabric are written on the label, cloth information may be obtained by recognizing characters indicating information on the type and composition rate of the fabric from the label image.

Alternatively, barcode information in the photographed image may be extracted and the extracted barcode information may be transmitted to an external server. In addition, the cloth information may be identified by receiving cloth information corresponding to the barcode information from the external server.

As another example, a plurality of clothes images and cloth information for each of the plurality of clothes images may be stored, and an image generated by photographing clothes subject to be managed may be compared with a plurality of stored clothes images. A clothes image corresponding to the photographed image may be determined, and clothes corresponding to the determined clothes image may be identified as clothes subject to be managed.

In addition, a clothing management method corresponding to the identified cloth information is determined from among a plurality of clothing management methods S1530. Specifically, a representative fabric may be determined based on the type and composition rate of fabric included in the cloth information, and a clothing management method may be determined based on the determined representative fabric.

For example, a fabric type having the highest composition rate among the fabric types may be determined as the representative fabric, and the most optimized clothing management method for the determined representative fabric may be determined.

As another example, a representative fabric may be determined in consideration of both a weighted value and a composition rate corresponding to each fabric type, and a clothing management method the most optimized for the determined representative fabric may be determined.

As another example, when a predetermined type of fabric requiring special management such as silk is included among the fabric types, a predetermined type of fabric may be determined as a representative fabric regardless of composition rates of other fabrics. Alternatively, when a predetermined type of fabric is included in a predetermined composition rate or more, it may be determined as a representative fabric.

In addition, when determining the representative fabric, not only one type is determined, but a predetermined number of representative fabrics may be determined, and the most optimized clothing management method may be determined in consideration of all the determined predetermined number of representative fabrics.

Meanwhile, a method of determining a clothing management method corresponding to the identified cloth information among the plurality of clothing management methods is not limited to the example described above.

Then, a clothing management operation is performed based on operation information corresponding to the determined clothing management method S1540. Specifically, the spray device and the circulation device may be controlled based on pre-stored operation information corresponding to the determined clothing management method.

Therefore, since the control method of the clothing treatment apparatus of the disclosure determines the clothing management method in consideration of the type and composition rate of fabric included in an actual clothing, what functions are actually required for clothes subject to be managed may be more accurately identified, thereby reducing a problem of causing damage to clothes due to an inappropriate function to the clothes. The method of controlling a display apparatus of FIG. 15 may be performed, for example, in the clothing treatment apparatus having the configuration of FIG. 1 or FIG. 2, and may also be performed in a clothing treatment apparatus having other configurations.

In addition, the above-described controlling method may be realized as at least one execution program to execute the above-described controlling method, and such an execution program may be stored in a non-transient computer-readable recording medium.

A non-transitory computer readable medium may refer to a machine-readable medium or device that stores data semi-permanently and not for a short period of time, such as a register, cache, memory, and the like. Specifically, the above-mentioned various applications or programs may be stored in a non-temporal recordable medium such as a CD, DVD, hard disk, Blu-ray disk, USB, memory card, and ROM and provided therein.

Figure 16:
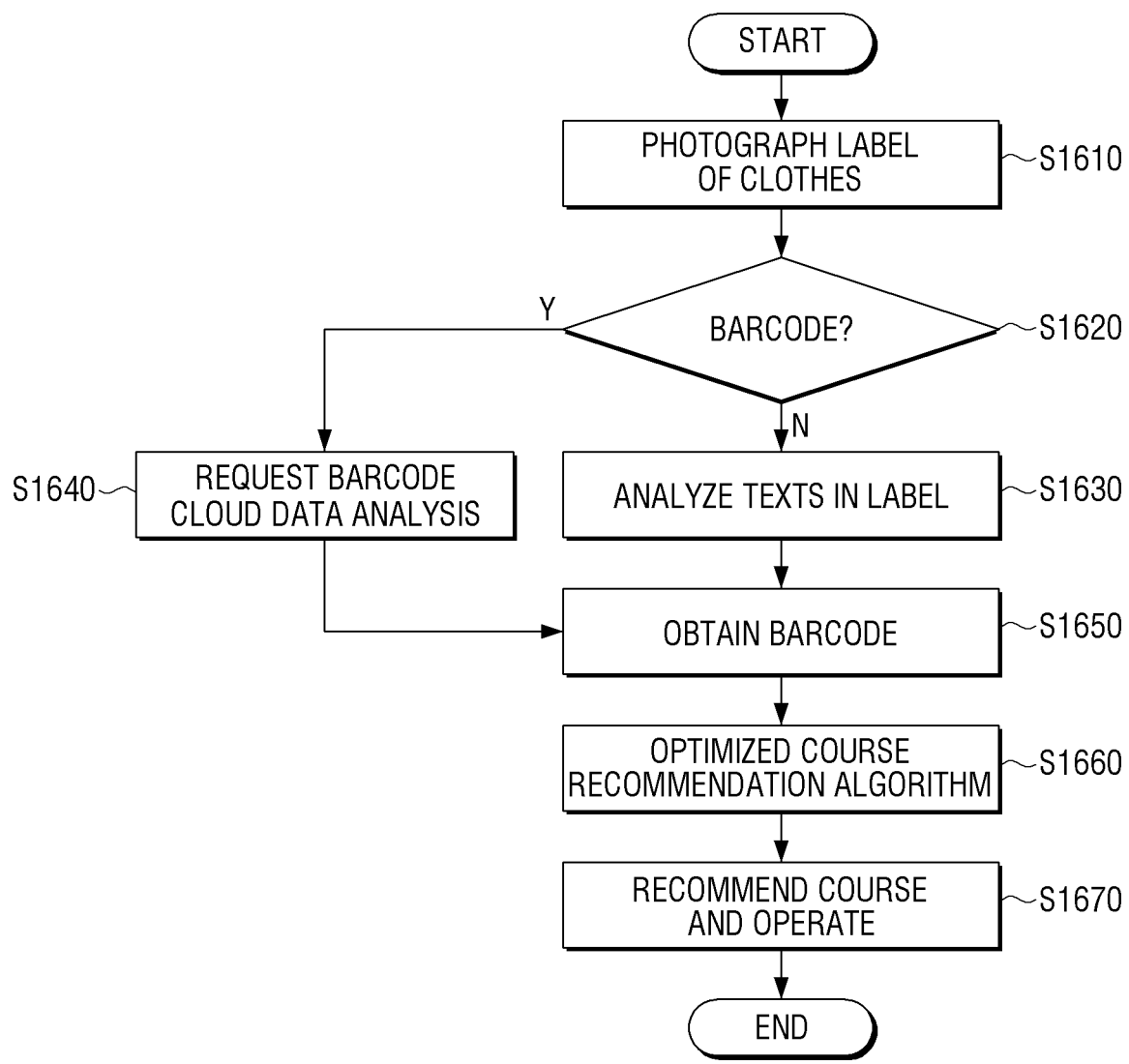
FIG. 16 is a flowchart illustrating a detailed controlling method of a clothing treatment apparatus according to an embodiment of the disclosure.

FIG. 16 is a flowchart illustrating a method of obtaining cloth information using a photographing device according to an embodiment of the disclosure.

A label of a clothing subject to be managed may be photographed using a photographing device S1610. In addition, it may identify whether barcode information exists in the photographed image S1620. In general, information on a type and a composition rate of fabric is written on a label, and barcode information may be written on some labels.

If there is no bar code information in the photographed image S1620-N, the type and the composition rate of fabric written in a label of clothes may be recognized S1630. Specifically, characters corresponding to information on the type and composition rate of fabric may be recognized through an optical character recognition (OCR) method. In addition, cloth information may be obtained from a result of recognizing the character S1650.

Meanwhile, if there is barcode information in the photographed image S1620-Y, it may request an external server to analyze the barcode information S1640. Specifically, the extracted barcode information may be transmitted to the external server, and cloth information corresponding to the transmitted barcode information may be requested. The external server may be a cloud server.

In addition, cloth information may be obtained by receiving cloth information corresponding to the barcode information transmitted from the external server S1650. In addition, a clothing management method corresponding to a clothing subject to be managed may be determined using the obtained cloth information S1660.

The clothing treatment apparatus may be controlled to operate according to the determined clothes management method S1670. In addition, a plurality of clothing management methods corresponding to the obtained cloth information may be determined, and information on the determined plurality of clothing management methods may be provided to the user to receive a selection of one clothing management method.

Meanwhile, in illustrating and describing FIG. 16, the operation described above is performed by the clothing treatment apparatus, but may be implemented by performing the operation described above in an electronic apparatus connectable to the clothing treatment apparatus during implementation.

Accordingly, since the method of obtaining cloth information using the photographing device of the disclosure may simply obtain cloth information by photographing a label of clothes, even if the user does not directly input the cloth information, thereby increasing user convenience. The control method as illustrated in FIG. 16 may be executed on the clothing treatment apparatus having the configuration of FIG. 1 or 2, or an electronic apparatus having the configuration of FIG. 4 or 5, and may be executed on the clothing treatment apparatus or the electronic apparatus having other configurations.

In addition, the above-described controlling method may be realized as at least one execution program to execute the above-described controlling method, and such an execution program may be stored in a non-transient computer-readable recording medium.

Figure 17:
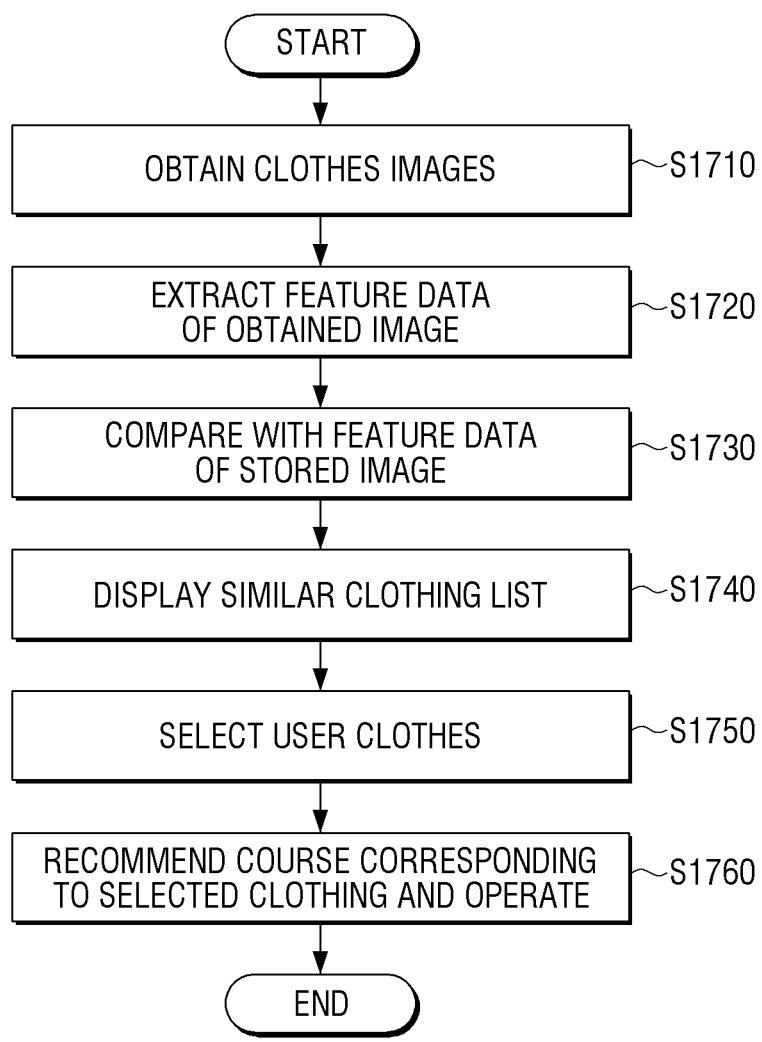
FIG. 17 is a flowchart illustrating an operation of identifying clothes subject to be managed and determining a management method using a photographing device according to an embodiment of the disclosure.

FIG. 17 is a flowchart illustrating a method of identifying clothes subject to be managed using a photographing device according to an embodiment of the disclosure.

Referring to FIG. 17, clothes subject to be managed may be photographed by using a photographing device, cloth information of clothes subject to be managed may be identified by using the photographed image, and a management method may be determined by using the identified cloth information. These operations may be performed not only in the clothing treatment apparatus but also in an electronic apparatus that can be connected to the clothing treatment apparatus.

Figure 14:
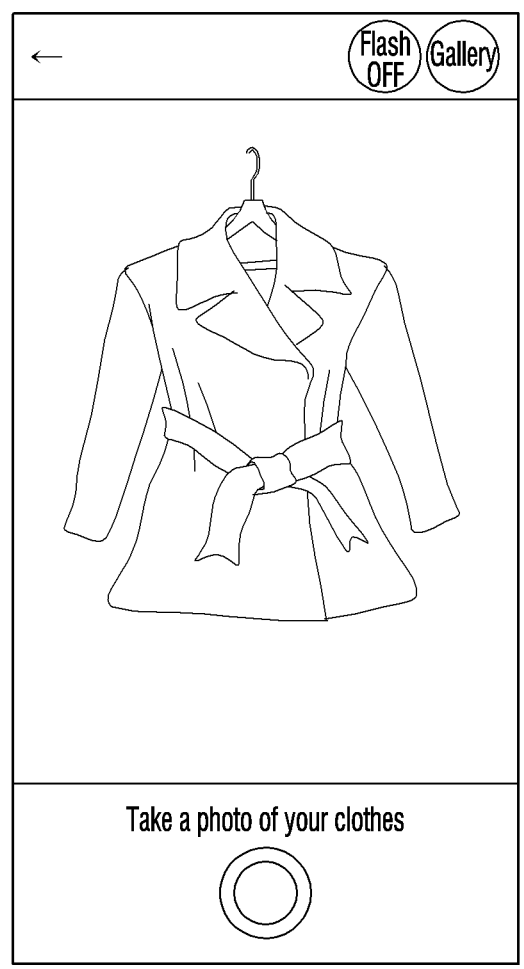
FIG. 14 is a view illustrating an operation of identifying clothes subject to be managed using a photographing device.

An image of clothes subject to be managed may be obtained S1710. When the photographing device is provided with the clothing treatment apparatus or the electronic apparatus, an image of the clothes may be obtained by photographing the clothes subject to be managed using the photographing device. Specifically, referring to FIG. 14, an image of clothes may be obtained by photographing the overall shape of clothes subject to be managed using the photographing device.

In addition, feature data of the obtained image may be extracted S1720. Here, the feature data may be information such as shape, color, and pattern of clothes, but is not limited thereto.

It may be compared with feature data of images for the plurality of pre-stored clothes S1730. Specifically, feature data of the obtained image may be compared with feature data of a pre-stored image, and an image having a similar feature data as the obtained feature data of the image among the pre-stored images may be identified.

The pre-stored image may refer to an image stored after photographing the user's clothes through the photographing device or an image received and stored from an external device.

A list of clothes similar to clothes subject to be managed may be displayed among a plurality of clothes based on a result of comparing the feature data S1740. Similar clothes displayed in the list are clothes corresponding to images having the same or similar feature data. Also, all clothes corresponding to an image having the same or similar feature data may be displayed, or a predetermined number may be displayed.

One of the similar clothes list may be selected from the user S1750. Specifically, one clothes may be selected from the user through the input device. When the input device is a display capable of a touch function, a list of similar clothes may be displayed through the display, and one clothes may be selected from the user.

In addition, a clothing management method corresponding to the selected clothes may be determined, and may control to operate according to the determined clothing management method S1760.

Accordingly, since the method of identifying clothes subject to be managed using the photographing device of the disclosure allows the user to conveniently identify clothes subject to be managed through photographing of clothes even if the user does not directly select an index of the clothes subject to be managed, the user convenience may be increased. The control method as illustrated in FIG. 17 may be executed on the clothing treatment apparatus having the configuration of FIG. 1 or 2, or the electronic apparatus having the configuration of FIGS. 4 and 5, and may be executed on the clothing treatment apparatus or the electronic apparatus having other configurations.

In addition, the controlling method as described above may be implemented as at least one execution program to execute the above-described controlling method, and such an execution program may be stored in a non-transient computer-readable recording medium.

Although the preferred exemplary embodiments of the disclosure have been disclosed for illustrative purposes, those skilled in the art will appreciate that various modifications, additions and substitutions are possible, without departing from the scope and spirit of the disclosure as disclosed in the accompanying claims. Accordingly, such modifications, additions and substitutions should also be understood to fall within the scope of the disclosure.

What is claimed is:

1. A clothing treatment apparatus, the apparatus comprising:
   a clothing support device configured to support or fix clothing inside an accommodation space of the clothing treatment apparatus;
   a spray device configured to spray steam or air on the clothing inside the accommodation space;
   a circulation device configured to circulate the air inside the accommodation space;
   memory configured to store a plurality of clothing management methods, and operation information of the spray device and the circulation device for each of the plurality of clothing management methods; and
   a processor configured to:
      identify cloth information of the clothing inside the accommodation space, the cloth information including a type of each fabric included in the clothing inside the accommodation space,
      determine a representative fabric based on a fabric type and a composition rate of fabric among the cloth information, the composition rate being a percentage of each different fabric type present in the accommodation space,
      determine a clothing management method corresponding to the identified cloth information based on the determined representative fabric, from among the plurality of clothing management methods,
      control the spray device and the circulation device based on the stored operation information corresponding to the determined clothing management method.

2. The apparatus of claim 1, further comprising:
   a camera configured to capture an image of a label on clothes,
   wherein the processor is configured to obtain cloth information of the clothes using the image captured by the camera.

3. The apparatus of claim 2, further comprising:
a communication device configured to communicate with an external server,
wherein the processor is further configured to:
   extract barcode information in the image,
   control the communication device to transmit the extracted barcode information to the external server, and
   receive cloth information corresponding to the barcode information from the external server.

4. The apparatus of claim 1, further comprising:
a camera configured to photograph clothes,
wherein the memory is configured to store a plurality of clothes images and cloth information with respect to each of the plurality of clothes images, and
wherein the processor is further configured to determine an image of clothes corresponding to a photographed image from among the plurality of clothes images using an image photographed by the camera, and determine a clothing management method using the stored cloth information corresponding to the determined image of clothes.

5. The apparatus of claim 1, wherein the processor is further configured to determine the representative fabric in consideration of a weighted value corresponding to information on the fabric type.

6. The apparatus of claim 1, wherein the processor is further configured to, based on a predetermined type being included in the information on the fabric type, determine the predetermined type as the representative fabric.

7. The apparatus of claim 6, wherein the processor is further configured to, based on the predetermined type being included in the fabric type more than a predetermined composition rate, determine the predetermined type as the representative fabric.

* * * * *